United States Patent [19]
Thomson et al.

[11] Patent Number: 4,948,174
[45] Date of Patent: Aug. 14, 1990

[54] FINANCIAL DATA PROCESSING SYSTEM

[75] Inventors: Eric A. Thomson, Newport Beach, Calif.; Stanley M. Josephson, Dallas, Tex.

[73] Assignee: Remittance Technology Corporation, Irvine, Calif.

[21] Appl. No.: 399,376

[22] Filed: Aug. 24, 1989

Related U.S. Application Data

[63] Continuation of Ser. No. 183,776, Apr. 20, 1988, abandoned.

[51] Int. Cl.⁵ .............................................. B42D 15/00
[52] U.S. Cl. ........................................ 283/58; 283/70
[58] Field of Search .................................... 283/58, 70

[56] References Cited

U.S. PATENT DOCUMENTS

| | | | |
|---|---|---|---|
| 1,272,258 | 7/1918 | Henning . | |
| 1,284,264 | 11/1918 | Dunfee | 283/58 |
| 1,299,647 | 4/1919 | Wood et al. . | |
| 1,343,110 | 6/1920 | Camp . | |
| 1,550,256 | 2/1924 | Hollidge . | |
| 1,585,440 | 5/1926 | Vansant . | |
| 1,608,294 | 11/1926 | Beman . | |
| 2,396,221 | 3/1946 | Yancey | 283/1 |
| 2,831,707 | 4/1958 | James et al. | 283/58 |
| 2,985,464 | 5/1961 | McFarland | 283/58 |
| 3,672,703 | 6/1972 | Jay | 283/58 X |
| 3,692,298 | 9/1972 | Peacock | 283/58 X |
| 3,790,193 | 2/1974 | McBride | 283/57 |
| 4,179,139 | 12/1979 | Savar et al. | 282/23 |
| 4,346,442 | 8/1982 | Musmanno | 283/58 X |
| 4,358,671 | 11/1982 | Case | 235/379 |
| 4,405,157 | 9/1983 | Bennett | 283/58 |
| 4,433,436 | 2/1984 | Carnes | 283/58 X |
| 4,585,160 | 4/1986 | Fiske, II | 283/58 X |
| 4,594,663 | 6/1986 | Nagata et al. | 364/401 |
| 4,637,634 | 1/1987 | Troy et al. | 283/58 X |
| 4,673,803 | 6/1987 | Ohmae et al. | 235/379 |

FOREIGN PATENT DOCUMENTS

WO8502148  5/1985  World Int. Prop. O. ............ 283/58

Primary Examiner—Paul A. Bell
Attorney, Agent, or Firm—Lyon & Lyon

[57] ABSTRACT

There are disclosed herein methods and systems for affecting the accounting functions of debiting and crediting a bank's account records, a payer's bank account records and a corporation's accounts receivable records with their customers's payments, and are based upon the combination of data from two or more sources to prepare an integrated document comprising an invoice (bill) and a negotiable instrument, usually a bank check. These documents form an integrated document and contain all necessary pre-printed machine readable data and are combined to effect a variety of multi-function transactions. By combining all of the required data elements in a single document at the time of initial preparation of the integrated document, including an accounts receivable invoice and the payer's check, the requirement for subsequent redundant, labor intensive processes are eliminated. The single integrated document becomes a multi-functional document which generates the transaction to effect the customer's accounts receivable, the negotiable instrument to (i) credit the coporation's financial institutions account and (ii) debit the customer's financial institution's account while creating a complete audit trail and accountability at each separate processing level.

2 Claims, 6 Drawing Sheets

_91_ ~ Remittance Technology Corporation

David W. Robinson  
13692 Tea House Street ~ _90_  _10_  
Santa Ana, California 92705

I N V O I C E

| Account No. | Date |
|---|---|
| 0128903 | 01/27/87 |

_92_  _93_

| Date | Type of Service | Charges | Payment | Net Amount |
|---|---|---|---|---|
| 01/15/87 | Monthly Service Charge | 12.95 | 0.00 | 12.95 |
| 01/15/87 | HBO Premium Service | 9.95 | 0.00 | 9.95 |

_94_

| Total Due |
|---|
| $22.90 |

Please date and sign the attached personalized check and return it in the enclosed envelope. Use the form below for changes.

Please record this amount in your check register  
Please retain this portion for your records

---

Please use this form for any changes  _11_

Mark through the appropriate box below and return this form with your payment.

_95_

Remittance Technology Corporation  
P.O. Box 224033  
Dallas, Texas 75265-0022

 ☐ I do not wish to use the enclosed SMARTCHECK (TM). My personal check or other payment is enclosed.

 ☐ I have changed bank accounts, and still wish to receive SMARTCHECKs (TM). A check from my new account is enclosed. Please send future checks for my new account.

Account Number: 0128903  _96_  
Amount Due: $22.90

 ☐ Please note my new name/address. I have entered corrections on the back of this form.

 ☐ I wish to pay by credit card (Master Charge or Visa). I have signed the authorization to the left.

_98_  
Credit Card # _____  
Expires: _____  
Signature: _____

0128903000870115000000229

---

SMARTCHECK (TM)  _12_

David W. Robinson  
13692 Tea House Street  
Santa Ana, California 92705

12-172/1220

_40_

Pay To  Remittance Technology Corporation  
P.O. Box 225961  
Dallas, Texas 75265-0022

_100_ _____ 19___

$ ***22.90*

--------TWENTY TWO AND 90/100----------------------------------------- Dollars

BANK OF SOUTHERN CALIFORNIA  
16743 Sepulveda Blvd.  
Los Angeles, California 90021

_105_

Memo _Service for 01/87 - Account 0128903_

Signature - Check not valid unless signed by account owner

⑆0128903⑆ ⑈122001721⑈ 0001″315″   ⑆000000 2290⑆

_FIG. 1a._

Please indicate changes to your name/address:

David W. Robinson

13692 Tea House Street

Santa Ana, California 92705 fig.2a.
FRONT SIDE

- 14 — PAYER NAME & ADDRESS
- 20 — CHECK NO.
- 25 — (routing fraction)
- 40 — PAYEE NAME (PAY TO ORDER)
- 65 — OCR/BAR CODE A/R ACCT.#
- 100 — OCR/BAR CODE AMOUNT
- 55 — AMT. DUE $ (NUMERIC)
- 41 — P.O. BOX / PERIOD PAYMENT CODE
- 50 — AMOUNT DUE (WRITTEN) DOLLARS
- 15 — BANK NAME & ADDRESS
- 105 — SIGNATURE – CHECK NOT VALID UNLESS SIGNED BY ACCOUNT OWNER
- 60 — A/R ACCOUNT # / AUX ON-US
- 35 — TRANSIT/ROUTING
- 30 — BANK ACCOUNT #
- 70 — AMOUNT fig.2b.
BACK SIDE

- 80 — FOR DEPOSIT ONLY TO ACCOUNT / PAYEE NAME
- 85 — BANK NAME & LOCATION TRANSIT/ROUTING
- 86 — ACCOUNT #

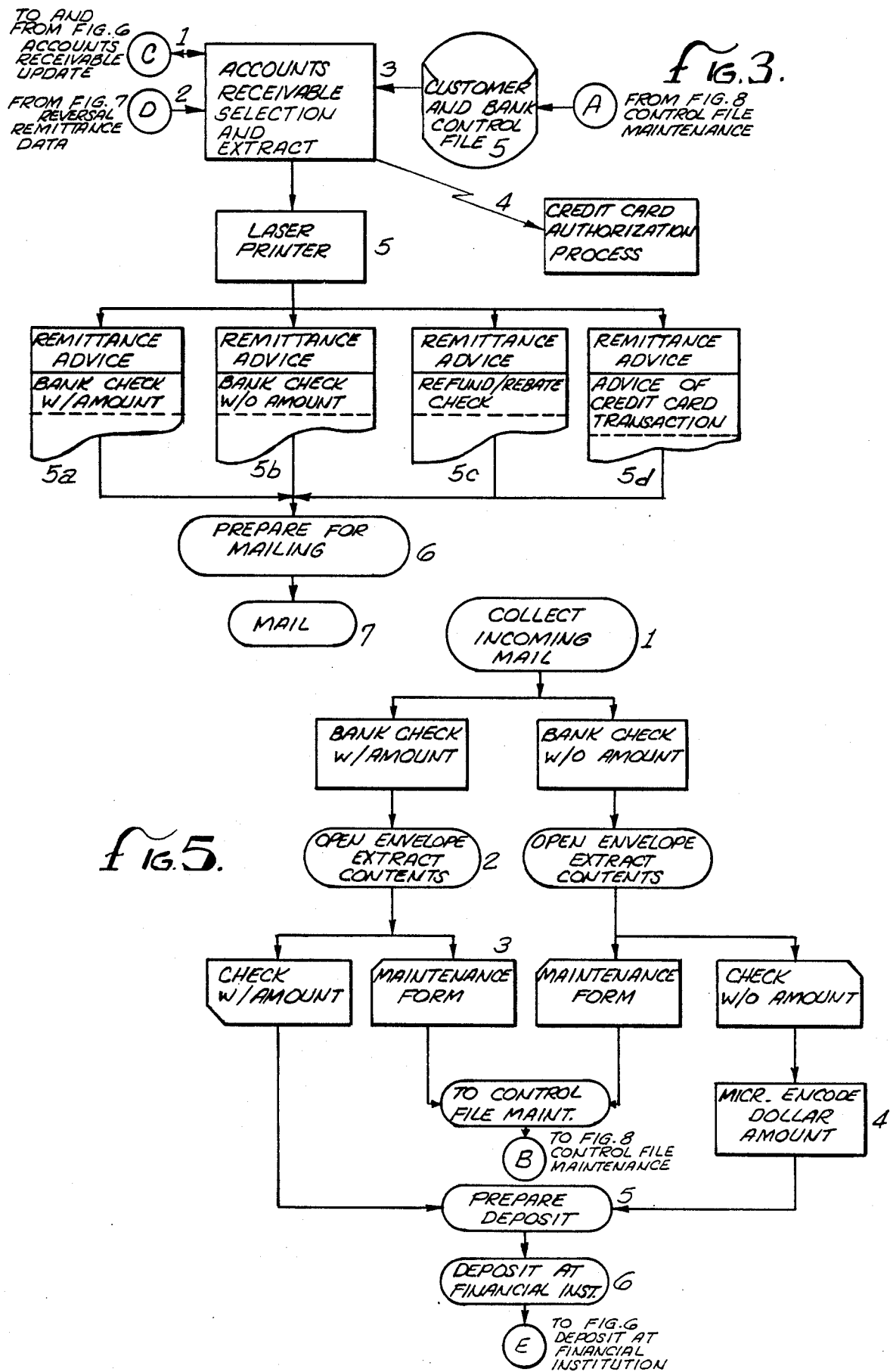

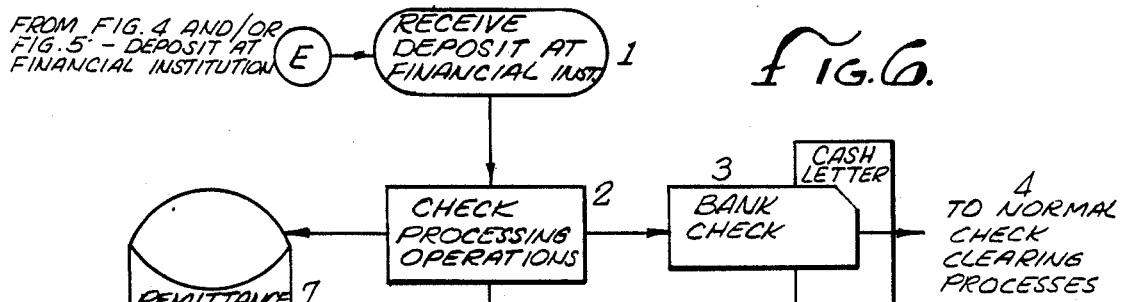
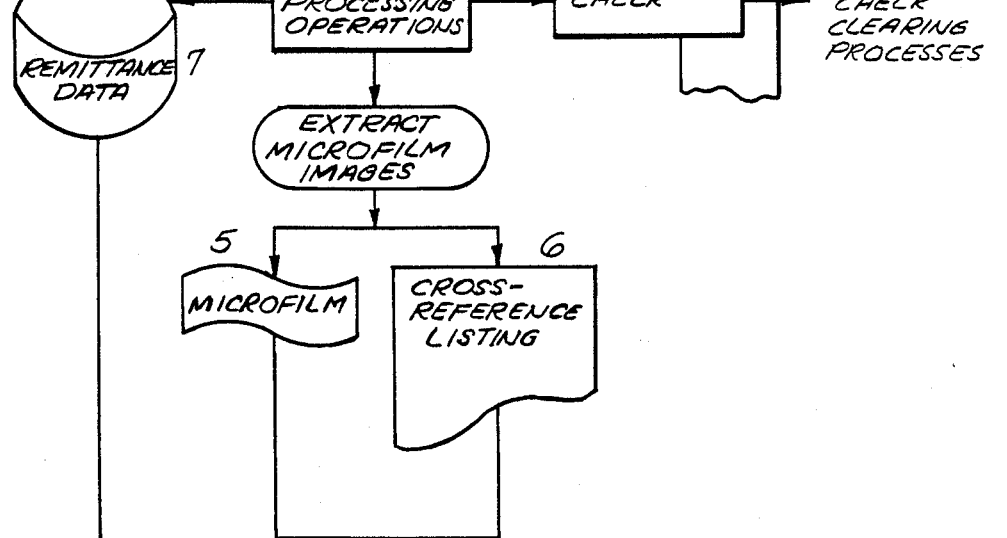
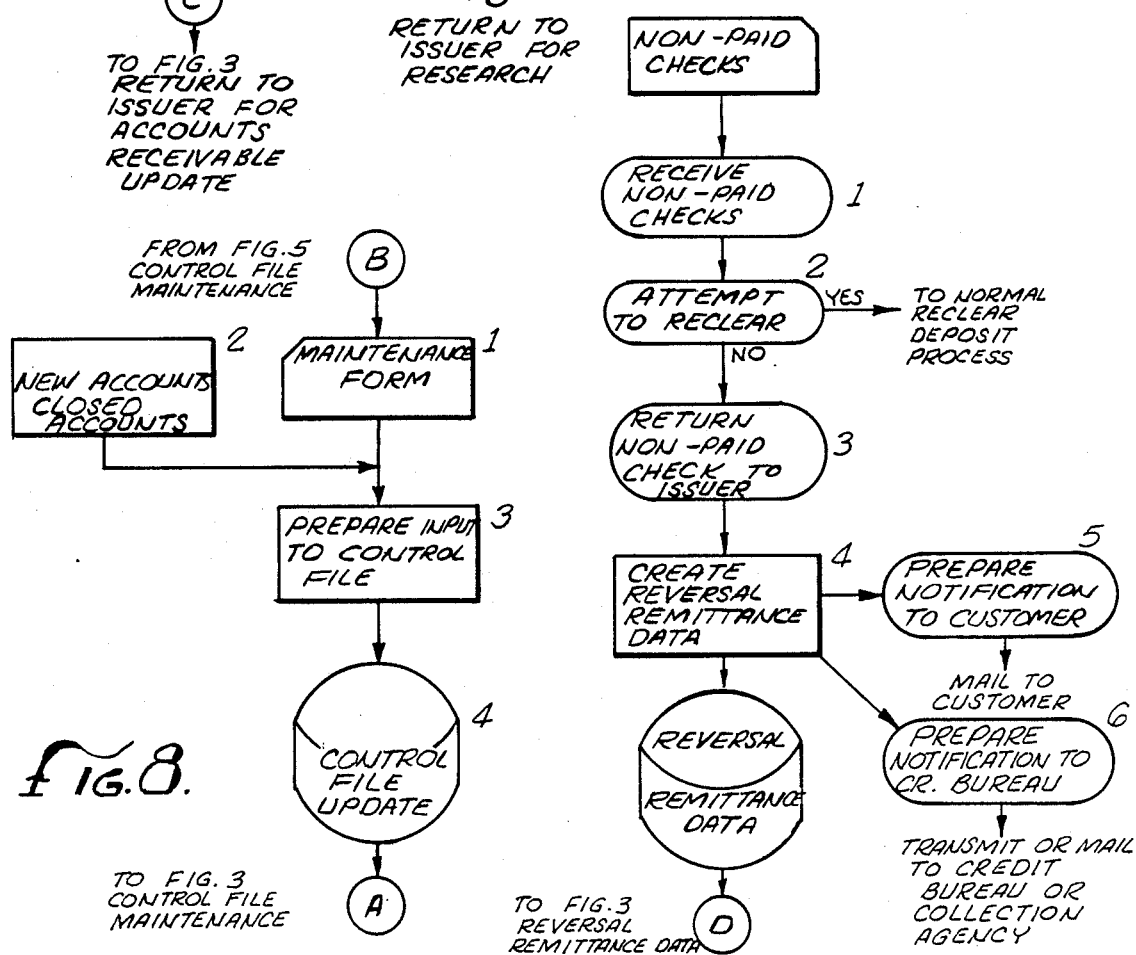

FINANCIAL DATA PROCESSING SYSTEM

This is a continuation of co-pending application Ser. No. 183,776 filed on Apr. 20, 1988, now abandoned.

BACKGROUND OF THE INVENTION

This invention relates to invoicing and bill paying processes and systems. More specifically it relates to financial data processing systems and, in particular, to accounts receivable billing and receipt and/or payment acceptance systems which utilize a return remittance document in combination with a customer initiated negotiable instrument, such as a bank check, for accomplishing the application of funds to account receivable records.

Typically, invoicing and bill paying processes are accomplished through a variety of manual procedures and automated systems; however, all incorporate a similar characteristic, namely the preparation and mailing of a periodic customer invoice or bill which includes a separate or detachable bill stub, or alternately, a package of periodic payment coupons, designed to be returned by mail by the recipient (payer) with an accompanying payment usually in the form of a bank check. Upon receipt by the payee or depository bank of the incoming remittance envelope, the contents are examined, sorted and, if acceptance criteria are met, the two documents (bill stub or coupon and check) are physically compared by manual or automated means, and appropriate data is extracted and records are generated. One record is used to apply the funds to the payee's accounts receivable. An additional record prepares the bank check for deposit at a financial institution for processing the check through the check clearing network for application to the payer's account at a financial institution and ultimately returned as a cancelled check to the payer with the monthly checking account statement to allow the payer to reconcile the checking account and be used as proof of payment, if needed. This check clearing process requires the amount of the check to be encoded with a machine readable code by manual or automated means by the depository financial institution preparatory to the clearing process.

The above method of processing is widely used for routine household bill paying for a variety of products and services. Typical uses are credit card payments, mortgage and installment loan payments, utility payments and insurance premium payments. The public (corporations and individual consumers) has accepted this method of processing and this bill payment method has become a routine procedure in most households and companies.

These processing systems, however, have certain disadvantages. For example, the labor intensive, manual processes that must be performed in combining the two types of documents (bill stubs and checks) that are necessary to properly create the application records generate many problems (called "exceptions"). Some of the problems involve a check without an accompanying remittance document, a remittance document without an accompanying check, incorrect payee, stale-dated or post-dated check, incorrect payment amount, multiple documents of either type, restrictive notations, unidentified payee, cash payments and third party checks. Each of these problems requires manual decisions, special handling, and costly labor intensive processes. Even without these problems, the proper combining of the two documents results in duplicate, redundant processing steps such as microfilming, control total generation, reconciling steps, and dual audit trails. Consequently, this method of processing is expensive, time consuming and error prone.

Corporations that perform this type of processing absorb the highest portion of these costs and have been experimenting with alternative methods such as electronic remittance processing. The Automated Clearing House (ACH) process is one type of electronic payment system. Typically, the customer initiates a request to the corporation to electronically charge the customer's checking account for the exact payment on a predetermined date each payment period. Electronic transfers are made at that time crediting the customer's payee's accounts receivable and debiting the customer's checking account at the appropriate financial institution. While this process is quite automated, consumer acceptance has been minimal and it has not been successful on a national scale. As a result, the volumes are low and corporations must be equipped to process in both the electronic and the more expensive paper based modes which in turn result in overall higher costs. Customers, in general, have not accepted the electronic method of payment because they recognize that they do not control the timing and amount of the payment, have no receipt and are unfamiliar with procedures to initiate stop payments, to change financial institutions, or to discontinue the service.

Household bill paying procedures in certain European countries utilize a single document process called a "GIRO". It is essentially a bill or invoice which includes a return portion to effect a funds transfer. The payer authorizes payment by signing the return stub and indicating the payment amount, and returning that portion to the issuer or to a central processing service. Funds are transferred upon receipt of the document. The accounts receivable is credited, and the payer's depository funds are debited.

In THE GIRO method, the return portion is not a negotiable instrument and does not provide the payer nor the payee the legal protection afforded under the Uniform Commercial Code. The major differences between the check clearing process and Federal Reserve System in the United States as compared to those in a European country do not allow a GIRO system to operate within the United States. This coupled with the "central bank" concept in Europe verses the large number of United States commercial banks, savings banks, savings and loan associations and credit unions (over 16,000) which provide Demand Deposit Accounts preclude the use of the GIRO process in this country.

An automated system which would incorporate the essential elements of the current two documents used in conventional remittance systems into a single document thereby reducing the time, the labor, the documents processed, the correction procedures needed to resolve errors, and the resultant expenses of such processing is and has been desirable. Moreover, such an automated system that should preserve the characteristics and integrity of the bank check would provide the consumer and financial institution with an unquestionable high level of acceptance and widespread use, as well as significant economic gains. Such an automated system is the purpose of this invention.

GLOSSARY OF TERMS

The following terms are used herein for clarity and convenience.

Integrated Billing Document is the document produced at the time of accounts receivable billing or invoicing. It is typically composed of three parts; namely, (1) a bill or invoice, (2) a maintenance and payment option selection alternative document, and (3) a check document. It must contain both (1) and (3) either as one simple sheet or two separate related sheets.

Check document (or bank check) is that portion of the integrated billing document referred to as a unit record, negotiable instrument or check.

Payee is the company to which the check document is payable, also referred to as the corporation, issuer or billing entity.

Payer is the individual that negotiates the check document, also referred to as the customer or consumer.

Remittance Processor processes for the payee the check document upon its return from the payer. This may be the payee or a financial institution or data processing servicer.

Bank is a financial institution which may be a bank, savings association, credit union or Federal Reserve Bank.

Depository Bank is the bank of first deposit of the check document.

Drawee Bank is the bank on which the check document is drawn.

Machine Readable Fonts include magnetic ink character recognition (MICR), optical character recognition (OCR), Bar Code and all others now or in the future.

Lockbox is a U.S. Post Office box number or address established by the payee or the bank or data processing servicer to which all like remittance mail is sent and accumulated for pick-up.

SUMMARY OF THE INVENTION

The foregoing description of the two document processes and other related difficulties of that remittance processing method are solved by this invention which includes:

(1) a novel document with a unique format, machine readable fonts and capable of changes in function as it, or portions of it, pass through the remittance processing steps, and (2) a new method covering the entire remittance processing cycle from initial data extraction, data processing, data merging and printing through to completion of the payment steps.

This invention incorporates the use of high speed page printers, like the Xerox 9700 laser printer, which are capable of producing standard machine readable fonts, such as Optical Character Recognition (OCR) and Bar Codes as well as Magnetic Ink Character Recognition (MICR) fonts in conjunction with suitable computer programs to produce a formatted integrated billing document. The document comprises up to three portions, (1) a bill or invoice, (2) a maintenance and payment selection alternative notice, and (3) a fully qualified unit record or bank check. This invention provides a single document which serves as the notification to the customer of the billing details, as a means to communicate address, bank changes, other account selection and maintenance activity, and as a fully qualified bank check from the customer. Consequently, the present invention eliminates the requirement of the remittance processing function to organize, compare, handle, control and process at least two separate documents.

The present system and method provide the flexibility, through data base design and program logic, to produce a variety of styles, fonts, formats and data elements to tailor the integrated billing document to specific customized requirements; however, the negotiable instrument (bank check) is produced in compliance with industry standards (American Bankers Association Publication 147R3—"The Common Machine Language").

As the integrated billing documents are produced, they can be combined with a return envelope and prepared for mailing to the corporation's (payee) customers. Upon receipt by the customer, the billing portion is separated from the bank check. The customer dates and signs the check, thereby creating a fully negotiable instrument, and places the check in an envelope for return mail.

Upon receipt of the mail at the corporation or at their depository bank (i.e., "lockbox") through the postal system, the envelopes are opened and the enclosed checks are grouped ("batched") to prepare a deposit to the corporation's account at a financial institution. The fully negotiable check contains all of the necessary information in machine-readable characters to pass through all financial institution's processes that are performed in the various stages of the check clearing process. In addition to the required information printed on the check, including the payment amount, the depository bank's standard endorsement can also be printed on the back of the check at the time of initial document preparation along with the customer's accounts receivable number or a composite of that number in machine readable characters printed on the face of the check and subsequently used to update the corporation's account receivable system.

Upon receipt of the corporation's deposit at their financial institution, conventional standard data processing methods used in a bank's check processing operations perform the validation microfilming, capture and pocketing of each of the checks which comprise the deposit. As a by-product of this operation, the remittance data, including the customer's accounts receivable number and amount paid, is temporarily placed on storage devices preparatory to transmission of the data to the corporation. This data, when received, is used by the corporation's accounts receivable system to automatically update each customer's account receivable record with the payment data. Also, as a by-product of the bank's normal processes, the microfilm images of both the front and back of the checks are prepared for delivery to the corporation for archival and problem solving ("research") purposes. The checks then proceed through normal check clearing operations through the nationwide network of banks and Federal Reserve processes to distribute the check to the bank where the customer's account is located. Ultimately, the "cancelled" check is returned to the customer in the monthly statement of account.

Through other aspects of the process, the same system accommodates many ancillary processes, such as automated stop payment, automated return item handling, and automated overpayment reimbursement, through the use of appropriate machine readable codes. This system, which incorporates data, that has historically required two separate unique documents, into a single, multi-purpose document, provides all of the functionality of the conventional system, but in a highly efficient, economical manner.

Savings are realized by the major reduction in personnel costs through the reduction of half of the incoming document volume (elimination of the bill stub), the associated reduction of labor intensive operations (comparison of bill stub and check amount and encoding amount on check), elimination of equipment, file storage, floor space and administrative overhead. The reductions are outlined below and illustrate a savings of about 50 percent.

CONVENTIONAL REMITTANCE PROCESSING

Management (5%): Supervision, administration, reporting, customer service.

Mail Functions (5%): Collect, mail sorting, open.

Inspection (10%): Review, examine, segregate, batch, log.

Remittance Processing (45%): Reading/scanning, encoding, endorse, capture, microfilm.

Control (15%): Balance, verify, adjust, reconcile, prepare deposit, data preparation, data transmission, store or destroy bill stub.

Exception Processing (20%): Irregular, unreadable, correspondence, unprocessable, stop payments, returns.

NEW METHOD OF REMITTANCE PROCESSING

Management (5%): Supervision, administration, reporting, customer service.

Mail Functions (5%): Collect, mail sorting, open.

Inspection (5%): Review, examine, segregate.

Remittance Processing (22%): Reading/scanning, capture, microfilm.

Control (8%): Balance, verify, adjust, prepare deposit, data preparation, data transmission.

Exception Processing (5%): Correspondence, stop payments, returns.

The integrity of the initially prepared document is retained throughout the entire process, which results in the reduction of labor needed to recreate the data as it proceeds through the various stages of the process, thereby eliminating costly exception procedures, balancing steps, reconciliation, the need for audit and document storage and handling. Through this process, it is expected that other remittance costs will be reduced through earlier payment receipt time, lower bank check clearing charges and reduction of, and more rapid response to, customer inquiries.

Controls are incurred as a result of the integrated single document printing process that assures the payee that its accounting records are updated from source documents which it originated. The payer is assured that the payment made to the corporate service provider is accurate and receipt of the cancelled check document represents proof of payment. The check document can be printed by the payee with control features such as restricted endorsements and alternative return address that facialitate rapid and accurate posting of payment to the payer's account.

Accordingly, it is a principal object of the present invention to provide an improved invoicing and bill paying process and system.

Another object of this invention is to provide a new form of invoicing and billing document in the form of an integrated billing document.

Another object of this invention is to provide an integrated billing document comprising an invoice and unit record.

A further object of this invention is to provide a new form of financial data processing system and which uses an integrated billing document comprising at least a unit record and invoice.

These and other objects and features of the present invention will become better understood through a consideration of the following description taken in conjunction with the drawings.

BRIEF DESCRIPTION OF DRAWINGS

FIGS. 1a and 1b show one form of an integrated billing document according to the present invention, with FIG. 1a showing the front and FIG. 1b showing the back thereof.

FIGS. 2a and 2b illustrate details of the unit record or bank check of the present invention.

FIG. 3 is a flow chart illustrating how the accounts receivable update, printing and mailing of invoices is performed according to the present invention.

FIG. 5 is a flow chart illustrating the detailed processing steps for returned ("incoming") remittances in accordance with the present invention and, in comparison with FIG. 4, shows the efficiencies, labor reduction and cost reductions available by practicing the concepts of the present invention.

FIG. 6 is a flow chart illustrating the detail of the check processing functions.

FIG. 7 is a flow chart illustrating the detail of the non-paid check processing functions.

FIG. 8 is a flow chart illustrating control file maintenance processing functions.

DETAILED DESCRIPTION

Figure 1B:
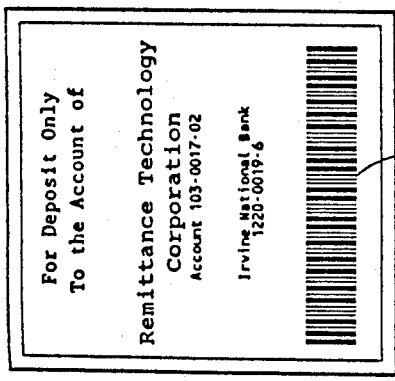

Turning now to a detailed description of the concepts of the present invention, and exemplary embodiments of the method, system and documents involved, the integrated billing document will first be described, and particularly the unit record (namely, the fully negotiable bank check) thereof. The integrated billing document as shown in FIG. 1 comprises the three parts previously discussed, the invoice or bill 10, the maintenance and payment selection alternatives 11, and the unit record or negotiable bank check 12. The check or unit record 12 is shown in greater detail in FIGS. 2a and 2b, with FIG. 2a showing the front side and content thereof, and FIG. 2b showing printed endorsements on the back of the check 12.

The unit record 12 contains all of the standard information commonly printed on a personalized consumer check. This standard information includes the full name and address of the account holder (payer) 14, the full name and address of the financial institution (drawee) 15, which may be a bank, savings association, or credit union, a sequential check number or reference number 20, the fractional form of the financial institutions transit/routing number 25, and the magnetic ink (MICR) form for the payer's bank account number 30 and the drawee transit/routing number 35. Areas are set aside for the payer and include the date, written dollar amount, numeric dollar amount, signature, and payee's name.

At the time of producing the periodic customer's accounts receivable bill or invoice 10, the standard information described above is retrieved from a data base (customer and financial institution control file), formatted and printed by use of a page printer with magnetic ink capability (e.g., laser printer of FIG. 3). The data base contains the following data elements: customer name and address 14, customer's bank name and address 15, customer's bank account number 30, and bank transit/routing number 25 and 35. Other coding within the data base specifies the type of integrated document to be produced, certain characteristics of the bank, stop payment status and delinquent or prepaid status.

According to the present invention, additional data extracted from the data base is also printed on the unit record 12, and includes the payee name, address or Post Office Box number, city, state and zip code 40, optionally a machine readable payment code 41, the amount due in written form 50 and numeric form 55, the customer's accounts receivable number (for the payee or billing entity) in the form of magnetic ink characters 60 or optionally in optical character recognition (OCR) characters or bar code fonts 65. The amount due also is printed in magnetic ink 70, or optionally optical characters or bar code 75. All this information is formatted and printed on the unit record under the control of the customer and financial institution data base in combination with the accounts receivable file as is further explained in connection with FIG. 3.

The corporation's standard endorsements can be printed on the reverse side of the unit record as shown in FIG. 2b. This information, composed of payee's account styling data 80 and variable endorsement data 85 are retrieved from a file which contains the endorsement information for one or more of the specific depository financial institutions selected by the payee as its depository. A bar code, e.g. to satisfy Federal Reserve requirements, 87 can also be included on the reverse side in addition to the numeric representation 86 of the routing number, such as is shown in FIG. 1b.

The invoice/billing information 10 part of the integrated document of FIG. 1 contains customized data as may be required by the issuer. It contains the payer's name and address 90, the payee's name 91, the customers account number at the payee 92, billing or invoice date 93, and total amount due 94. Optionally, prior payment transaction details may be shown, and current payment details may be shown, as well as alternate payment plans, account status and other information that is appropriate based on generally accepted billing practices. Additionally, this part 10 of the integrated billing document may include the offering of inducements to encourage the customer to use the unit record 12 payment alternative.

The maintenance and payment selection alternatives section 11 of the integrated billing document allows the payer to indicate alternative methods of remitting payment and to provide information for an address change and a bank account change. It contains variable data dependent on the options allowed by the payee. At a minimum, the payee's printed name and address 95, and the payer's account number 96 in human readable, and specifically machine readable, font are included. Optionally the form 11 may contain a credit card payment authorization 98, as well as name and address change data on the reverse side (FIG. 1b) and bank account change data on the reverse side. For customers electing not to use the unit record, this section 11 replaces the billing stub in the conventional remittance processing systems.

When the customer receives the integrated billing document (FIG. 1) including the bill or invoice 10 and unit record 12, the customer dates the unit record 12 at 100 and signs the same at 105, thereby creating a fully negotiable instrument. The unit record 12 is placed in a return envelope (not shown) preferably so constructed as to display the payee name, address or Post Office Box number, city, state and zip code 40 in a window opening for postal delivery to the specified address. Through suitable program instructions, a corporation may choose to direct the mail to one of several locations (e.g., "lockbox") by printing a suitable address or Post Office box number and destination on the unit record 12. This allows the unit record 12 to be sent to the most advantageous remittance processing location based on variable factors, such as for example, customer location, mail times, amount of check, alternative processing facilities, account delinquency status, and so forth. This also allows the corporation to reduce mail time float, accelerate the check clearing process, enhance controls and reduce bank check collection fees.

Upon receipt of the envelope containing the unit record 12 at the corporation's location or the corporation's depository financial institution, the unit record 12 is extracted and prepared for deposit at the corporation's depository financial institution. Depending on the corporation's processing environment, the unit records may be processed through standard remittance equipment that can read, validate and extract data from the machine readable portion of the unit record 12 to prepare a file to update their customer's accounts receivable records, or alternatively the corporation can present the unit records to their depository financial institution to extract the machine readable data and prepare a file for subsequent delivery to the corporation for updating the accounts receivable file. The later method utilizes standard financial institution methods and procedures to accommodate the capture, validation and extraction process. During this process, the unit records are microfilmed and a cross-reference index is prepared that is used by the corporation for customer inquiry and research purposes. The unit records are routed to their final destination, the drawee financial institution, through the normal check clearing process for payment against the customer's checking account.

In the event that the customer has issued a stop payment against the unit record, or the unit record is drawn against uncollected funds, the account is closed, insufficient funds exist in the account or for any other non-payment condition, the unit record 12 is returned, in its original form, through the normal return item clearing process to the financial institution of first deposit. The financial institution uses the unit record, in its original form, to reduce the payee's account balance and to automatically prepare a reverse transaction that will affect the payer's accounts receivable record. Computer interfaces between the accounts receivable file and the customer and financial institution control file recognize this situation and automatically produce status code changes to reflect this condition.

The maintenance and payment selection form 11 containing notification of customers' address changes and/or drawee bank changes may be received in the incoming envelope along with the unit record. These notifications are used to maintain the customer and financial institution's control file through an on-line interactive maintenance program. Bank name and address changes are maintained by computer interfaces between the customer and financial institutions control file and the data base of financial institutions such as that supplied by RandMcNally and Company. Maintenance regarding adding new customers and customers to be deleted is received through input forms (not shown) and accommodated through the same on-line interactive maintenance process.

For the present invention, the maintenance and payment selection form 11 replaces the bill stub of the conventional remittance processing system if the customer pays by personal check, money order or cash. The address 95 on the payment selection from 11 will be different than the address 40 on the unit record 12 and will, typically, not be the same address, i.e. "lockbox", where the conventional remittance bill stub and personal check would be sent. Customers who continue to pay with personal checks will be given incentives through a variety of marketing efforts, to use the unit record. For those who chose not to use the unit record, their payments will continue to be processed in the conventional manner.

An additional customer benefit of the present invention is the ability to print the payee's name on the unit record 12 as indicated at 40 in FIG. 2a. Although the security aspects of printing the payee's name on the endorsement is apparent from FIG. 2b, it can be useful to include the protection to the payer by having the payee's name on the face of the unit record.

There are numerous instances of checks being received through a lockbox where the "pay to the order portion" is left blank. These type checks have been known to be segregated by lockbox personnel and deposited to a fraudulent account set-up for that purpose. In other words, the lockbox employee completes the check by adding the name of a "dummy" payee account and subsequently deposits the checks and periodically withdraws the funds. The situation is not discovered until the payer receives a notice of delinquency. The integrated printing of the invoice and the unit record, with the payee name and payee's endorsement included, virtually eliminates any chance of this type of fraud.

Figure 4:
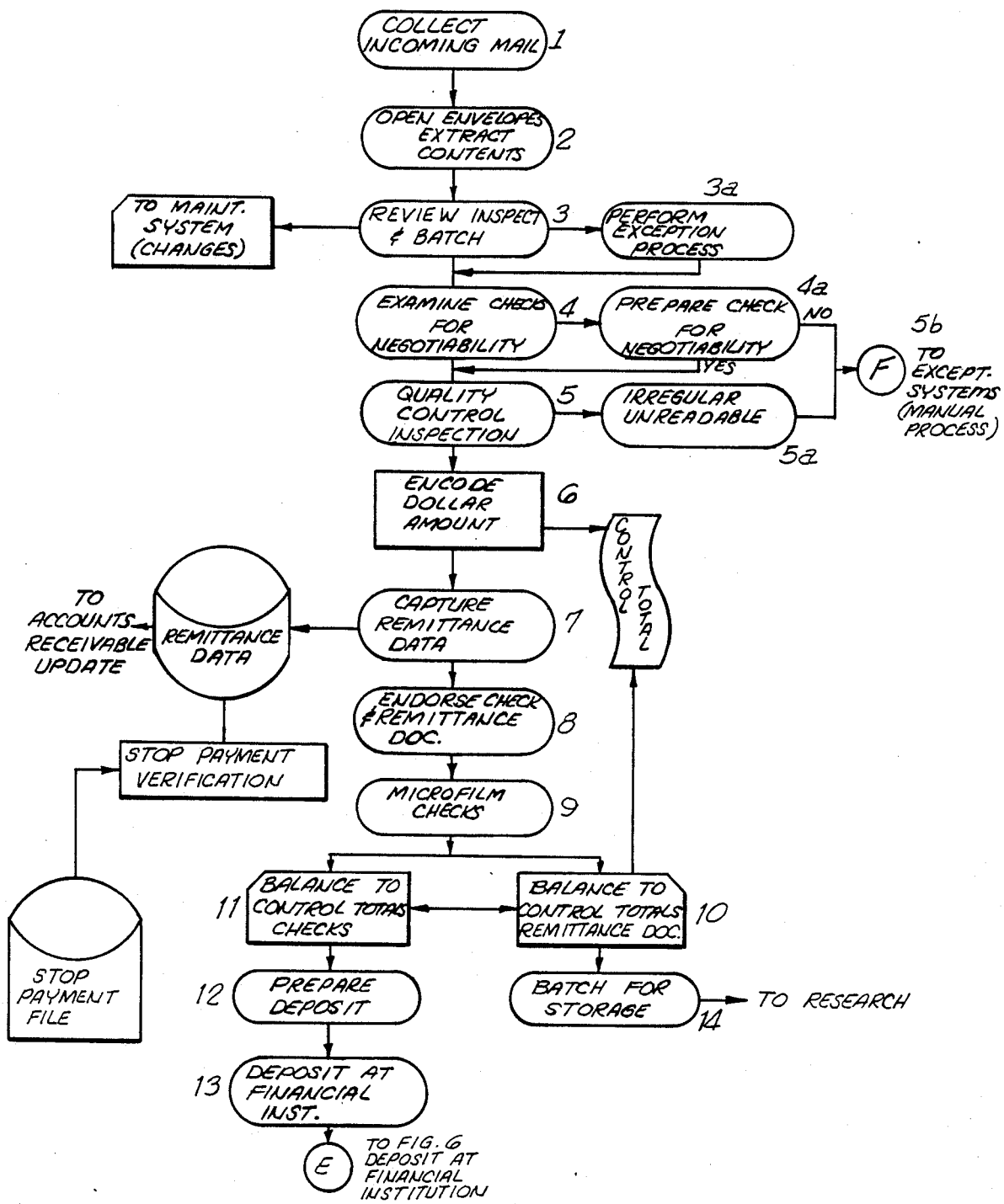
FIG. 4 is a flow chart illustrating a typical set of the detailed processing steps for returned ("incoming") remittances as presently conducted in conventional financial data processing systems.

FIG. 3 illustrates how the printing of the integrated billing document is performed from customer and bank files and how the accounts receivable selection and extract and mailing of invoices is performed according to the new method of this invention. FIGS. 4 and 5 show the detailed processing steps for incoming remittances in the conventional and new processing methods, respectively. The reduction in required processing steps in the present method (FIG. 5) as compared to the conventional method (FIG. 4) is indicative of the efficiencies, labor reduction and cost reduction created by this invention. FIGS. 6 and 7 provide further detail of the check processing functions and non-paid check processing functions respectively, and FIG. 8 illustrates control file maintenance.

FIG. 3 is a flow chart which illustrates how the accounts receivable selection and extract, printing and mailing of invoices is performed according to the present invention. Set forth below is a brief description of each of the elements of FIG. 3 (the identification numbers in FIG. 3 correspond to the paragraph numbers set forth below).

1. Receive accounts receivable data to perform accounts receivable selection and extract process.

2. Receive unpaid item data for items that have failed to reclear.

3. Computer processing to interface, match and extract required data from the previously updated customer and control file data base and update customer and control file data base with current accounts receivable data.

4. Process accounts receivable selection and extract system and generate data for acceptance into a credit authorization process, such as MasterCard and VISA.

5. Print integrated billing documents depending on corporation control file parameters and selection criteria. Printer must be capable of printing all required machine readable codes, e.g. MICR.

5a. Integrated billing document with pre-printed amount.

5b. Integrated billing document without pre-printed amount.

5c. Integrated billing document with pre-printed refund or rebate check.

5d. Integrated billing document with notice of credit card transaction.

6. Prepare integrated billing documents for mailing.

7. Mail integrated billing documents.

FIG. 4 is a flow chart illustrating the processing steps for incoming remittances in conventional processing systems (with the identification numbers corresponding to the paragraph numbers below).

1. Collect mail from Post Office Boxes.

2. Open envelopes and extract contents.

3. Review and inspect contents to determine which remittances (bill stubs and checks) are processable and which are unprocessable. Batch bill stubs and checks in control groups.

3a. Perform exception processing procedures for unprocessable remittances, correspondence and other non remittance documents.

4. Examine the checks for negotiability and acceptability.

4a. Perform exception processing procedures for non negotiable checks.

5. Verify the amount remitted on the check with the remittance document (bill stub).

5a. Perform exception processing procedures for irregular payments, i.e. amount remitted not equal to amount billed.

5b. Perform exception processing for unreadable remittance documents.

6. Encode check with dollar amount and prepare control totals.

7. Capture remittance document data for transmission for subsequent updating of account receivable files.

8. Endorse the remittance document with audit trail information and the check with the standard endorsement.

9. Microfilm remittance documents and/or checks.

10. Balance the remittance documents to control totals.

11. Perform stop payment verification processes.

12. Prepare deposit documents.

13. Deliver deposits to the depository financial institution.

14. Batch bill stubs or coupons for storage or destruction.

FIG. 5 is a flow chart which details the steps for incoming unit record remittances according to the new method of the present invention, and particularly illustrates the significant simplification available through the practice of the present invention in comparison to the conventional processing steps of FIG. 4 (again, the numerals in the figure correspond to those below).

1. Collect mail from Post Office boxes.
2. Open envelopes and extract contents.
3. Segregate maintenance forms and correspondence.
4. Encode dollar amount on checks with no pre-printed amount.
5. Prepare deposit documents.
6. Deliver deposit to depository financial institution.

FIGS. 6 and 7 illustrate detail of the check processing functions and non-paid check processing functions, respectively, and FIG. 8 illustrates control file maintenance (with numerals therein corresponding to the numbered paragraphs below). FIG. 6 illustrates the financial institution check clearing processing functions.

1. Receive pre batched deposit with accompanying control totals.
2. Perform normal check processing operations which include: Validate, microfilm, endorse, capture, pocket deposited checks, and correct and re-enter rejected checks and reconcile checks to control totals of deposit documents.
3. Prepare cash letters to clearing financial institutions and Federal Reserve banks.
4. Dispatch cash letters to appropriate sending points.
5. Extract and develop microfilm images of checks.
6. Prepare cross reference listing of checks in account number sequence.
7. Extract remittance data for subsequent updating of accounts receivable file.
8. Return microfilm and cross reference list to issuer for research purposes.

FIG. 7 illustrates the non-paid check processing functions as set forth below.

1. Receive non-paid checks from payer's financial institution (bank function).
2. Attempt to re-deposit and re-clear non-paid items (bank function).
3. Return non-paid checks to the issuer or depositor (bank function).
4. Using the original unit record (check) to automatically create a reversal transaction that generates a file for subsequent accounts receivable update processing.
5. Prepare notification of non-paid check to payer.
6. Prepare optional notification to credit bureau and collection departments.

FIG. 8 illustrates the maintenance update functions.

1. Receive maintenance forms.
2. Receive new accounts and closed account maintenance forms.
3. Prepare maintenance for input to customer and bank control file.
4. Enter maintenance activity to customer and bank control file.

As will be readily apparent to those skilled in the art, implementation of various aspects of the present method and system preferably is accomplished through the use of conventional data processing equipment and suitable computer software programs. The foregoing description of the integrated billing document, as well as the various steps involved in creating and processing this document and the unit record itself will make it apparent to those skilled in the art how to develop the suitable programs, there being numerous modifications and variations which will be possible because of the particular requirements of the payee and banking institution and banking channels involved. Even so, set forth below is a further discussion of the software for accomplishing the methods of the present invention. The software preferably is designed to be generic in that it has the facility to function in a standard manner, but utilizes customized options and parameters that tailor the standard processes for specific requirements desired by the individual corporation (payee) and by the depository financial institution.

There are three primary computer software systems; customer and financial institution control file sub-system, accounts receivable selection and extract sub-system, and reader/sorter sub-system. The detailed description of each of these sub-systems is as follows.

Customer and Financial Institution Control file Sub-system

This system includes the functions of generation of the initial customer and financial institution control file data base from source data and from the extraction of data from other data base sources and the periodic update and maintenance of the data base. The contents of the file includes such elements as:

| Fixed Data Base Elements | Sources |
| --- | --- |
| Customer name and address | Accounts receivable file |
| Financial institution name and address | Financial institution data base |
| Accounts receivable account number | Accounts receivable file |
| Transit/Routing number | Financial institution data base |
| Financial institution customer's account number | Source data |
| Payee name | Corporation control file parameters |
| Payee format control code | Corporation control file parameters |
| Refund/Rebate option code | Corporation control file parameters |
| Variable message data | Corporation control file parameters |
| Billing sequence code | Corporation control file parameters |
| Endorsement financial institution | Endorsement control files styling and description parameters |
| Payee destination (Post Office box, instructions) | Destination control file city, state and zip |

| Variable Data Base Elements | |
| --- | --- |
| Billing cycle code | Accounts receivable file |
| Current billing amount | Accounts receivable file |
| Prior billing amounts | Accounts receivable file |
| Past due code | Accounts receivable file |
| Delinquent code | Accounts receivable file |
| Customer option selection code | Source data |
| Variable payment option | Source data |
| Billing period code | Accounts receivable file |

Certain data elements within the file may be updated through on-line interaction maintenance transactions that may add, delete or change certain data elements within the customer and financial institution control file.

The primary key to accessing the file is the combination of the customer's financial institution transit/routing number and the associated customer's account number. For inquiry purposes, the contents of the file may be accessed by customer name, customer partial name, customer address, accounts receivable account number, billing amount or certain combinations of the above.

The file is used to produce billing activity reports, statistical data, various types of management reports and usage statistics. The integrity of the file is maintained by the generation of internal record counts and other types of control totals. Access to the file is controlled by multi-level security codes which prevent unauthorized use.

The customer and financial institution control file data base is also accessed prior to the accounts receivable posting process to verify the incoming accounts receivable payment transactions and to reformat those records to be compatible with the types of records required for accounts receivable posting.

Accounts Receivable Selection and Extract Sub-System

The primary purpose of this sub-system is to select the appropriate accounts receivable records for the billing period and compare those records with matching data available on the customer and financial institution control file data base. The match is performed on the account receivable account number. The matching records are extracted and formatted as determined by the payee format control code, the variable message code, the financial institution endorsement styling and description file and the payee designation instructions. Upon completion of the extraction process, the selected records are sequenced according to the billing sequence code which segregates the selected record by zip code and type and format of bill to be produced (check with amount, check without amount, refund/rebate check, credit card billing).

These records are then released to a laser printer (FIG. 3), such as a Xerox 9700, which uses standard software to produce the integrated billing document (FIG. 1). Control totals and record counts are prepared to ensure that all billing information, item counts, and record counts agree with previously produced totals that were generated from the corporation's accounts receivable system.

An additional function of this subsystem is to verify the incoming accounts receivable payment transactions and to reformat and append data matched and extracted from the customer and financial institution control file data base for acceptance in the accounts receivable posting process. Reports are generated listing exception conditions such as unmatched payments, incorrect amounts paid, past due payments, delinquent payments, and the like. Other reports are produced for control purposes and for statistical reports such as elapsed time from billing to receipt, payment by type of billing to receipt, payment by type of billing method, overpayments, and so on.

Parameter accessible control features are provided that allow authorized users to obtain marketing, financial and/or agency compliance images from the laser printer. These parameter driven capabilities will also allow authorized users to implement various marketing incentive programs that can be rotated through the customer print file to reward and increase the unit record usage by customers.

Reader/Sorter Sub-System

This sub-system is designed to extract the Magnetic Ink Character Recognition (MICR) data, and if required, other machine readable data, from the data set (referred to as the mass data set when reader/sorter equipment such as an IBM 3890 is used for check capture). The sub-system selects the proper string of data by recognizing the corporation's financial institution's account number that is printed in MICR form on the deposit document preceding the checks. The extracted data is placed on an intermediate storage device, such as a magnetic tape, for subsequent delivery or transmission to the corporation. This data is then reformatted and matched with the customer and financial institution's control file on a key derived from the combination of payer's bank's transit/routing number and payer's bank's account number and, if present, payer's accounts receivable account number.

Control totals are prepared to reconcile the extracted data to the deposit amount previously provided. The sub-system also provides the means for the financial institution to prepare a cross-reference list from the extracted data that is sequenced in such a manner as to reference the location of the microfilm image of each check. The microfilm is produced as an automatic by-product of the capture process when using equipment such as an IBM 3890 reader/sorter. The microfilm and cross reference report may be produced on hard copy or microfiche and used for researching customer inquiries and for archive purpose.

Consolidated capture file information is balanced and transmitted to the payee's account receivable system for customer accounting updates. This information is further posted to a cash management control system that contains the depository bank's availability schedule. The matching of collected unit records and funds availability guidelines serves to accumulate to daily cash balance totals owed the payee for immediate drawdown or accumulations to future availability totals for out of area unit records. A reconciliation function is also performed in this system to match unit record issue file with paid file information. This matching process serves to provide quality control over the MICR printing features of the laser printers in use and reader sorters in use by the depository bank. The matching process also provides accurate measures of the delays from date of creation to date of funds receipt to update cash forecasting capabilities in this system. This forecasting module allows authorized users to interrogate the system to isolate which incentive campaigns are most effective in generating unit record usage by customers. Another control feature of the system is the monitoring of accumulated earnings from the various sources such as reduced internal costs, lower bank fees, quicker cash collection, etc.

Summary of Steps

A. The system and method of the present invention can be characterized as one which involves the creation and use of an integrated billing document which includes at least two portions; namely, an invoice or bill, and a check document, each of which have printed and encoded thereon certain particular data pertaining to the payee, payer, the amount of the bill, the payer's account number and the payer's accounts receivable number. Additional data may be included such as the payee's name, payee's coded account number, and so on. The integrated billing document also may include maintenance and payment selection alternatives.

B. In creating the integrated billing document, two sources of data are combined. The first is information from the customer (payer) file, (e.g., a cable TV customer). This information includes items such as the customer's bank account number and transit/routing number, billing account number and other appropriate identifications. The second source of information includes variable information and which basically comprises the accounts receivable information for the billing company (e.g., a cable TV company).

C. The integrated billing document (FIG. 1) is created from the foregoing information (FIG. 3). This document, as noted above, includes the invoice (indicating the services performed and the charges) and the check document itself. It also can include payment options (e.g., check off blocks to pay by credit card or by personal check). This overall integrated billing document is created by a high-speed printer, such as a laser printer (FIG. 3), and includes the appropriate MICR codes and/or OCR and/or bar codes on front and back of the check document portion for bank account, accounts receivable account, endorsement and the like.

D. The customer (payer) receives this integrated billing document, reviews the same, and selects a payment option. If he selects the unit record, he then signs and dates the check document, and returns the check document in a supplied return envelope. Typically, the return envelope has a transparent window such that the return address of either the unit record or the maintenance and payments option form may be read. Additionally, information required by or enabling more efficient processing by the U.S. Postal Service may be printed on the check, payment options form or the envelope, e.g. bar code which enables machine reading and sorting. The customer does not have to fill in any other information, nor does the customer have to use a conventional check.

E. After mailing, the check document part of the integrated billing document is received at a designated location, typically referred to as a "lockbox," which is at a predetermined location either at a bank or at the billing corporation. This lockbox location preferably is one which only receives these check documents for allowing subsequent automated processing.

F. The check documents from the lockbox are sent to a reader/sorter or other remittance equipment at that predetermined location which reads three or optionally four sets of information; namely, the customer's (payer's) account number, amount of check, and the customer's accounts receivable account number (if present), and the financial institution's transit/routing number. The system and method according to the present invention interpret this information. The customer's accounts receivable account number and dollar amount allow the accounts receivable file to be updated. The customer's (payer's) account number and transit/routing number from the check, along with the dollar amount which are read, allow, via suitable software program, the system to now proceed through normal automated check clearing processes.

G. The system and process include other fail-safe features, such as the automatic processing of return items, stop payments and the like, but the preceding-described steps comprise the main overall processing steps.

H. The system and process include other features that provide internal control, management information and performance tracking.

Features and Benefits

The integrated billing document and methods according to the present invention provide numerous features and benefits, particularly including those described below.

A document is created with the properties to completely identify all necessary elements to completely effect the application of payments to an issuer's accounting process, the depository financial institution's accounting processes and the drawee financial institution's accounting processes, and the ability to automatically convert that document to a negotiable instrument acceptable to, and capable of being automatically processed by all financial institutions, upon authorization by the payer. The necessary elements include, but are not limited to, the unique account number for payment, the unique dollar amount for payment, the unique alternative return address, the unique alternative payee designation, control codes, the unique alternative endorsement characteristics for payment deposit and the unique payment period identifier for which the unit record is proof of payment.

The integrated document comprises a portion devoted to invoice/billing information, a portion devoted to maintenance and payment selection alternatives, and a portion devoted to a unit record for funds transfer. The method of creating the integrated billing document uses data extracted from multiple sources; including, but not limited to, corporation accounts receivable files and customer and financial institution control files to produce the integrated document containing variable contents and into a variety of formats designed specifically for automated entry into the existing check clearing network without any further modification or preprocessing.

The system incorporates a combination of ingredients, including the unit record along with databases, software, computer, reading and printing technologies described herein to effect a more efficient and accurate remittance process.

The unit record incorporates multiple machine readable fonts, optionally in OCR, Bar Code or MICR, in any combination that can be automatically processed by equipment, such as IBM 3890 Reader/Sorter or Computer Entry Systems 9400 Remittance Processing terminals. A single document is used to generate multi-function automated transactions rather than multiple separate documents as used in conventional methods to effect the account posting process, the financial institutions check clearing network, the remittance processing and the return items processing.

The unit record incorporates a machine readable payment code 41, optionally in OCR or Bar Code font, that allows immediate identification as to whether the unit record payment is current, late or delinquent. This automatic identification allows the segregation of unit records according to billing period which expedites the process of accepting late or delinquent payments with or without a late charge, late payment penalty or possible return to payer in the case of delinquency.

The method of the present invention allows for multiple machine readable fonts, such as but not limited to MICR, OCR and BAR codes, to insure accuracy of information lift and account file update. For example, the unit record can contain redundant information in MICR and OCR fonts. Remittance processing equipment can read both at the same time and compare values to guarantee accuracy. Alternatively, the unit record can be printed in the size of a personal check with the check amount, payer bank account number and transit/routing in MICR along the bottom of the unit record and the payer's payee account number in OCR at some other position.

Of particular significance, the unit record of the present invention automatically changes from a portion of a billing document, to a negotiable document, to a payment posting document, to a reversal document (if required) and to a record of payment. The system provides for the same document, incorporating machine readable data which is printed on the document at the time of billing, to serve as a negotiable document, an accounts receivable posting document, a reversal document (if required) and a record of payment.

While the foregoing represent the primary features and advantages of the present invention, there also are various secondary features and advantages as set forth below.

The negotiable instrument (unit record) effects a funds transfer that can be used to credit the payment obligation of the issuing party. In fact, the unit record becomes a negotiable, personal check from the payer to the payee upon signing and dating, even though it was initially part of the integrated billing document from the payee.

The negotiable instrument is used to debit the payment obligation of the issuing party if sufficient authorized funds were not available at the time of presentment to the drawee financial institution. Because of its unique properties, the unit record enables the debit to be performed automatically using only that single document instead of two or more as with conventional systems.

The method provides the ability to access and retrieve the payer's accounts receivable account number from the customer and financial institution's data base automatically through the use of certain elements of machine readable data contained on the unit record. For example, if the issuer chooses to provide the payer with a unit record without the machine readable accounts receivable account number, that number may be accessed and retrieved for accounts receivable payment application by use of the combination of the payer's financial institution's transit/routing number and the payer's account number which provides a unique key for positive retrieval.

More comprehensive payment alternatives are possible. For example, an electronic print file capable of transmission to the payee's bank and descriptive listing on the monthly checking account statement can be provided.

Optional settlement by various payment methods including, but not limited to, credit card, automated clearing house (ACH), automated teller machine (ATM), manned teller workstation, point-of-purchase automated check-out stations, preauthorized draft and conventional billing practices are enabled. The customer and financial institution control file subsystem as described herein contains all the information required to make payment by any option upon authorization by the payer.

The method makes possible a series of collection time reporting and analysis systems which reflect the payer's relative payment return behavior unique to each, such as, type of payment, area of country, customer type, payment size, time of month/year, services used, and depository financial institution. No similar capability exists with conventional systems. Without the complete information contained on and read from the unit record, such data cannot be obtained.

The system is capable of enabling alternative information formats to encourage usage of different payment alternatives. For example, to encourage the use of the unit record, complete with the amount, a series of marketing incentives can be sequentially offered until the payer selects one which causes him to use the unit record for payment. After that, the incentive will remain the same as long as the preferred payment alternative continues to be used.

Microfilm image retrieval is allowed based upon the capture sequence and the unique account number of the unit record that is cross-referenced to the film image. For example, if an issuer wishes to locate a specific payer's check film image for the purpose of payment verification, the microfilm check image can be retrieved by selecting a retrieval process which uses the account number or the dollar amount or the payee's bank transit/routing number. This capability cannot be accomplished under conventional processes.

At the time of printing, the issuer can provide unique account information on the face of the check unique to each of their customers. For example, the unit record may be printed with year-to-date interest paid, and, when the cancelled check is returned to the customer, it provides proof of payment for Internal Revenue Service purposes. This capability cannot be accomplished by conventional methods. Alternatively, if an electrical utility elects to show comparisons of usage of electrical energy by the payer from period to period, this information can be incorporated. Ultimately, important payer information which must now be tracked by keeping the original invoice, may be incorporated into the cancelled check file, enabling the payer to eliminate one piece of paper associated with tracking periodic payments.

The present method adds security to the ultimate payment of funds to a single account for deposit at the depository bank for credit to the rightful payee, by printing the payee name on the front and the payee endorsement on the back of each unit record at the time of preparation. This approach uses duplex printers, such as the Xerox 9700, which print on both sides of the integrated billing document. Printing the depository financial institution's endorsement on the back of each unit record at the time of the unit record preparation, including the depository financial institution's standard nine digit routing number in OCR or BAR code, allows the drawee's financial institution to expedite a non-paid unit record to the depository bank through automated processes.

The single document moving through the traditional check processing channels creates the information necessary to update accounts receivable information of the issuing company.

Non-paid unit records automatically debit the prior payment information using the original source document. For example, the MICR information illustrated on the unit record can be read by the standard readers used in financial institutions. Then the software program enables the automatic debit and return of the non-paid unit record.

Non-paid unit records automatically create customer notification of non-payment and notification to central credit bureaus. For example, letters can automatically be prepared and sent to the payer and collection agencies informing them of delinquency and other credit information.

The method provides the ability to effect refunds, rebates and over payments within the same billing stream through the automatic issuance of a refund check drawn on the issuer's depository account. Although such checks presently are printed on MICR page printers, there exists no method whereby these payments to customers could be printed automatically as part of the remittance processing system.

The issuer can elect to provide various payment alternatives according to a range of criteria, such as geographic region of the country, customer characteristics, dollar amount of invoice, payer's financial institution, or time of year (holiday season for credit card option). For example, it may be more advantageous to offer the payer the flexibility to automatically change the method of payment if the amount due is significantly greater than the average amount due.

The issuer can communicate with individual segments of their customer base via use of negotiable financial instruments based upon such customer or transaction characteristics as drawee bank, services used, level of service usage, geographic region of the country, known household or corporate customer characteristics, dollar amount of invoice or time of year. In fact, this method enables information to be provided as a permanent record on returned cancelled checks.

Variable fields in the machine readable portions of a negotiable instrument can be used to provide access to databases for purposes of displaying descriptive information on the payer's financial statement issued by his financial institution. For example, the payer's account number can be used as the check number so that the bank statement would group information for unit records in a section of the statement that could also identify the payee, i.e., utility companies, charge cards, etc. This listing can allow enhanced bookkeeping for the payer to track monthly expenditures for goods and services.

The method of the present invention incorporates an ability to select and print unique data within the standard MICR portion of the unit record to deliver information from the payee to the payer that cannot now be delivered without using a separate method. For example, it is possible with the present invention to direct written information to a customer through the normal check clearing process by using the payer's personal bank account and routing numbers on a document satisfying acceptable standard sizes for unit records by delivering the document directly to a financial institution's lockbox, such that the message will be delivered with the customer's cancelled checks. This approach completely bypasses the postal system and would save an amount equal to the difference between the postage rate and the bank processing charges.

Last but not least, the present concepts provide a fully negotiable unit record that complies with all legal aspects of the Uniform Commercial Code. In particular, the payer and the drawee have all rights with respect to return for stop payment, return for uncollected funds, return for insufficient funds and return for closed accounts.

While embodiments of the present invention have been shown and described, various modifications may be made without departing from the spirit and scope of the present invention, and all such modifications and equivalents are intended to be covered.

What is claimed is:

1. An integrated billing document comprising two portions, one portion being an invoice or billing document, and the other portion being a check document,
   the voice document comprising a printed invoice indicating a matter billed, and including in human readable form a billing entity's name and address, a customer's name and address, the customer's account number at the billing entity, and the total dollar amount due, and
   the check document being in the form of a bank check having a first side and a second side with the first side having printed thereon in human readable form
   the customer's name and address as the payer,
   the bank name and address of the payer's bank
   the payer's bank account number,
   the account number of the customer/payer at the billing entity,
   the dollar amount due as indicated on the invoice document, and
   the matter billed as indicated on the invoice document,
   the first side having printed thereon in machine readable form
   the payer's bank transit/routing number,
   the payer's bank account number,
   the dollar amount to be paid, and
   the payer's account number at the billing entity,
   the first side of the check document further having date and signature portions left blank to be added by the payer at the time the check document is signed by the payer, and
   the second side of the check document having printed thereon
   the endorsement of the billing entity including the name of the billing entity,
   the name of the billing entity's depository bank,
   the account number of the billing entity at the depository bank, and
   the transit/routing number of the depository bank.

2. An integrated billing document as in claim 1 wherein the check portion is detachable from the invoice or billing document portion.

* * * * *